United States Patent [19]

Donnelly et al.

[11] 3,904,771

[45] Sept. 9, 1975

[54] PREPARATION OF WATER SOLUBLE GELATIN

[75] Inventors: Thomas H. Donnelly, Western Springs, Ill.; Robert S. McGinnis, Wenham, Mass.

[73] Assignee: Swift & Company, Chicago, Ill.

[22] Filed: Sept. 17, 1973

[21] Appl. No.: 398,152

[52] U.S. Cl. ............... 426/576; 426/590; 426/659; 426/471; 426/572
[51] Int. Cl. ............................ A23l 1/04; A23l 1/06
[58] Field of Search ........................... 426/168, 350

[56] References Cited
UNITED STATES PATENTS

| | | | |
|---|---|---|---|
| 2,253,614 | 8/1941 | Epstein | 426/168 |
| 2,841,498 | 7/1958 | Cahn | 426/168 |
| 3,143,428 | 8/1964 | Reimers et al. | 426/285 |
| 3,476,571 | 11/1969 | Block et al. | 426/168 |

FOREIGN PATENTS OR APPLICATIONS 6,809,670  1/1970  Netherlands........................ 426/168

*Primary Examiner*—A. Louis Monacell
*Assistant Examiner*—J. M. Hunter
*Attorney, Agent, or Firm*—Edward T. McCabe; Charles E. Bouton; Robert E. Blankenbaker

[57] ABSTRACT

Cold water soluble gelatin is prepared by co-drying gelatin with suitable edible acids, wherein the edible acid is present in amounts of from about 30% to 200% by weight of the gelatin.

12 Claims, No Drawings

PREPARATION OF WATER SOLUBLE GELATIN

This invention relates to the manufacture of cold water soluble gelatin having utility in the preparation of desserts, salads, mayonnaise, beverages, icing stabilizers, and stabilizers for dairy products such as ice cream, marshmallow foam, and the like.

Extensive research has been conducted in the past to develop what the art terms a "cold water soluble gelatin." This term refers to gelatin which will go easily into solution in tap water without the necessity of heating. It has been well-known in the art that in order to solubilize gelatin in water, the gelatin must be mixed into hot water; and then to form a gel, the hot solution must be cooled to a sufficiently low temperature, which may require several hours. This is inconvenient because of the time required to heat the water and the time required to cool the hot water/gelatin solution to form a gel. This is particularly a drawback with respect to the preparation of typical gelatin dessert gels.

There are a large number of patents directed to techniques for preparing cold water soluble gelatin which can be used in the preparation of typical gelatin desserts, but without the use of hot or boiling water. However, to the best of our knowledge, there are presently no cold water soluble gelatin dessert products on the market. This would indicate that none of the prior art work to date has been effective to develop a truly cold water soluble gelatin. Some of the patented inventions are directed to reacting the gelatin and/or coating the gelatin with various chemical agents in order to increase solubility. For example, see U.S. Pat. Nos. 3,332,782; 2,819,970; and 2,810,971. Other patents are directed to the concept of co-drying gelatin with various quantities of sugar in order to promote solubility of the gelatin. For example, see U.S. Pat. Nos. 3,362,830; 3,341,334; 2,984,622; 2,841,498; and 2,803,548. Other patents are directed to freeze-drying techniques or other special effects. For example, see U.S. Pat. Nos. 3,595,675; 3,514,518; 2,834,683; and 2,166,074. It is our experience that the work done in the prior art results in a gelatin product with increased tendencies toward hydration. That is, the prior art gelatin particles appear to hydrate in cold water, swelling to form a gel-like composition upon cooling. However, close observation of these prior art products indicates that the final composition is not a smooth, homogeneous gelatin gel, but rather, comprises an aggregation of swollen hydrated particles adhering together in the cold water.

Due to the inability of the prior art to prepare a truly cold water soluble dessert, commercial dessert products have been formulated which are based on carrageenan and/or alginates in lieu of gelatin. However, these types of desserts exhibit the same type of texture as the prior art gelatin desserts inasmuch as the carrageenan and alginate particles are hydrated, rather than being truly dissolved and subsequently gelled.

In addition to its use in cold water soluble desserts, there is also a potential use in the art for soluble gelatins for use as stabilizers in commercial icings and ice creams. Presently, most icings utilize as a stabilizer the gelatinous colloid agar, which is very expensive. If gelatin could be prepared in a soluble form, it could be used to replace agar in icings, and in other products such as ice cream and mayonnaise.

The best prior art we have been able to locate is French Pat. No. 2,012,559 which teaches the preparation of cold water soluble gelatin by co-drying a solution of gelatin and an edible acid such as citric acid. The quantity of acid is between 5–20% by weight of the gelatin. We have prepared products in accordance with the French Patent, and have made desserts therefrom (see Example II following). While these products are acceptable, and appear to constitute an improvement over the prior art, they still are slightly grainy and do not form a true solution or true gel.

Therefore, there is a continuing need in the art for a method of preparing a truly cold water soluble gelatin. Accordingly, the principal objective of the present invention is an improved method for treating gelatin so as to render the gelatin cold water soluble.

It is also an object of the present invention to prepare a soluble gelatin product which can be used to form improved high protein beverages and gelatin-based desserts.

These and other objectives are carried out by codrying gelatin with a suitable edible organic acid. Gelatin is a product obtained by the partial hydrolysis of collagen derived usually from the skin, white connective tissue, and bones of animals. It is a derived protein composed of various amino acids linked between adjacent amino and carbonyl groups to provide a peptide bond. Type-B gelatin is prepared by swelling the raw materials (usually ossein or hide stock) in an alkali saturated lime solution for 3 – 12 weeks. On the other hand, type-A gelatin is prepared by swelling raw materials (usually pork skins) in a dilute acid solution at a pH of 1 to 2 for 10 to 30 hours. The acid solution is prepared from hydrochloric acid, sulfurous acid, phosphoric acid or sulfuric acid.

In accordance with the present invention, type-A gelatin or type-B gelatin may be utilized. However, it is preferred to use either a base cured gelatin (type-B) or a hydrochloric acid cured type-A gelatin, and the hydrochloric acid cured type-A gelatin is most preferred. This is because gelatin molecules which have been acid cured with sulfuric or phosphoric acid are associated with multivalent anions which tend to raise the set rate and melting point of the gelatin. This effect is not significant when the gelatin molecules are associated with monovalent anions. The Bloom strength of the gelatin is not particularly important; however, gelatins having a Bloom strength of greater than about 200 are generally preferred.

It has been discovered that a limited number of edible organic acids have the ability to render gelatin soluble. Most organic acids do not exhibit this unique characteristic, or at most exhibit only a partial solubilizing influence on gelatin. We have discovered that among the edible organic acids there are several which, when co-dried with gelatin, will render the gelatin water soluble. These edible organic acids include citric acid, malic acid, ascorbic acid, tartaric acid, and mixtures thereof. Of the above acids citric, malic and ascorbic are preferred. Tartaric, while effective in solubilizing the gelatin, will result in insoluble acid tartrates at the typical pH of a gelatin dessert gel. Thus, where the final product composition contemplated should be a gelatin and water gel, e.g., a gelatin dessert, then tartaric acid should not be used as the solubilizing acid. On the other hand, tartaric acid may be used to solubilize gelatin when the final composition contemplated is not an aqueous solution, e.g., marshmallow foams, icings. We have also discovered that a blend of citric, malic, and ascorbic acids as the solubilizing agent is particularly effective. Preferably, these three acids should be mixed in approximately equal proportions, although any percentage combination is suitable. The gelatin/acid aqueous solution to be spray-dried should contain from about 1–15% solids by weight, and preferably from about 2–6%.

It is also possible to add sugar, such as fructose or sucrose, to the gelatin-acid solution prior to spray-drying in order to provide a product already containing a desired quantity of sugar. However, this is not required, and if sugar is desired in the final product, it may be simply blended with the spray-dried gelatin-acid composition. Also suitable buffer salts may be added to the gelatin-acid solution prior to spray-drying. Again, however, the presence of these buffer salts in the solution is not necessary, and if desired in the final product, may be added subsequent to spray-drying of the acid-gelatin solution. Such buffer salts include sodium citrate, sodium sulfate, diammonium phosphate, and disodium phosphate, and may also include sodium bicarbonate if an aerated product is to be produced.

Although it is not necessary, the gelatin-acid mixture which has been spray-dried may subsequently be treated with a suitable wetting agent, e.g., dioctyl sodium sulfosuccinate, in order to promote water dispersibility of the composition. Also, water dispersibility of the gelatin-acid composition may be maximized by "instantizing" the composition. Instantizing refers to the prior art technique of agglomerating particles in order to increase their bulk density such that the particles will sink when placed in water. This enables each particle to be surrounded by water, and thus promotes rapid dissolution of the solute. Thus, when the spray-dried gelatin-acid particles obtained by this invention are of a particle size and density such that they tend to float on the surface of water, it may be preferable to instantize the particles through agglomeration so as to increase their bulk density. Agglomeration techniques are well-known in the art and therefore will not be discussed at this point. However, it should be mentioned that agglomeration can be carried out in the drying chamber of a spray-drier by the addition of a suitable amount of moisture to the chamber once spray-dried particles have been formed therein. It should be remembered that the use of wetting agents and/or instantizing techniques are optional with respect to the present invention. Vigorous stirring of the gelatin-acid particles obtained by the present invention will achieve the desired solubilization, as will a technique of wetting to form a paste, followed by dissolution of the paste.

As previously mentioned, one of the most important utilities of the present invention is the preparation of gelatin-acid compositions which can be utilized in the preparation of cold water soluble gelatin desserts. In accordance with the prior art, these products are usually marketed in the form of a package of powder comprising gelatin, sugar, citric acid for tartness, buffer salts, flavoring and coloring. The package directions require adding the contents thereof to boiling water in order to dissolve the contents, and in particular, the gelatin. The resulting solution is then placed in a refrigerator and allowed to cool for several hours so as to set to a gel. With respect to the composition of the present invention, the gelatin-acid powder may be added to tap water, along with suitable amounts of sugar and buffer salts. The mixture is vigorously stirred in order to dissolve all solids, and the product will subsequently set to a complete gel in a refrigerator within from about 30 minutes to 1 hour. Clearly, this is a distinct time saving advantage over prior art products which often require several hours to set to a gel.

Another important utility of the present invention is in the preparation of high-protein acid beverages. Normally, gelatin beverages must contain a relatively low amount of gelatin (protein) inasmuch as too much gelatin will result in gelation of the beverage. However, in accordance with the present invention, gelatin can be retained in a fluid state by the presence of from 30% to 200%, and preferably from about 30% to 100%, of an edible acid selected from the group consisting of lactic acid, malic acid, ascorbic acid, tartaric acid, and mixtures thereof. Thus it is possible to prepare a fruit flavored beverage which is both high in protein (gelatin) and Vitamin C (ascorbic acid). For example, the present invention enables the preparation of protein fortified juices such as lemon, lime, grapefruit and orange. The spray-dried gelatin-acid composition is merely combined with water and sugar, along with suitable flavoring and coloring.

The invention will be described further in connection with the examples set forth below which are for purposes of illustration only. In the examples and elsewhere herein, proportions are expressed as parts by weight unless specifically stated to the contrary.

EXAMPLE I

A solution was prepared by blending the following:

```
  20 grams of hydrochloric acid pre-treated
     type-A gelatin
  10 grams citric acid
  10 grams ascorbic acid
 140 grams sugar
   4 grams sodium citrate
1658 grams of water
```

This solution was spray-dried, and the powder obtained was blended with 0.1 grams of a suitable coloring agent and 0.3 grams of a raspberry flavoring agent.

A second powder was prepared by blending 28 grams of sodium citrate, 4 grams of sodium sulfate and 136 grams of sugar.

A gelatin dessert was prepared by dissolving 100 grams of the spray-dried powder in 400 milliliter (ml.) of ordinary tap water. When this had been dissolved by stirring, 100 grams of the second powder (sugar-citrate-sulfate powder) was then dissolved in the solution. The solution was then placed in a refrigerator for one hour, after which it was removed and examined. The solution had set to a clear smooth gel, and was ready for serving.

EXAMPLE II

A gelatin dessert composition was prepared in accordance with Example I of French Pat. No. 2,012,559 by dissolving 5 parts by weight of citric acid in 100 parts by weight of a 30% solution of 180 gram Bloom, type-A gelatin. This solution was then spray-dried to form a powder. A mixture of 15 grams of this powder and 85 grams of powdered sugar were added to 500 cc. of water at 20°C. and mixed for 3 minutes. The solution was then placed in a refrigerator where it was left for one hour.

The gelatin powder appeared to go into solution with only 3 minutes stirring. Also, the product set to a gel in the refrigerator in one hour and did not melt down at room temperature. However, on inspection of the final product, it was seen to have relatively poor clarity compared to the product prepared in Example I above. More importantly, the final product prepared in accordance with the French patent was seen to consist of finely divided, hydrated gelatin particles, and thus imparted a somewhat grainy mouth-feel as compared to the smooth mouth-feel of a true gel.

While the present invention has been described in reference to specific embodiments, it should be obvious to one skilled in the art that many modifications and variations of the invention as hereinbefore set forth may be made without departing from the spirit and scope thereof, and therefore, only such limitations should be imposed as are indicated in the appended claims.

We claim:

1. A method of preparing cold water soluble gelatin comprising: forming an aqueous solution containing from about 1-15% solids, said solids comprising gelatin and from about 30% to 200% by weight of the gelatin of an edible organic acid selected from the group consisting of citric acid, malic acid, ascorbic acid, tartartic acid, and mixtures thereof; and thereafter spray-drying this solution to obtain a powder.

2. The process of claim 1 wherein the solids in solution comprise gelatin selected from the group consisting of base cured gelatin and hydrochloric acid cured gelatin, and from about 30% to about 100% by weight of the gelatin of an edible organic acid selected from the group consisting of citric acid, malic acid, ascorbic acid and mixtures thereof.

3. The process of claim 2 wherein the solution contains from about 2% to about 6% solids by weight.

4. The process of claim 2 wherein the 1 to 15% solids in solution contains sugar in addition to gelatin and edible acid.

5. The process of claim 2 including the additional step of agglomerating the spray-dried powder in order to increase the bulk density thereof.

6. The process of claim 2 including the additional step of blending the spray-dried powder with suitable quantities of sugar and buffer salt to provide a gelatin dessert base.

7. The process of claim 2 including the additional step of combining the spray-dried powder with sufficient water to provide a high-protein beverage.

8. The process of claim 2 including the additional step of incorporating the spray-dried powder into a food product as a stabilizer.

9. The process of claim 2 wherein the gelatin is hydrochloric acid cured gelatin.

10. The process of claim 2 wherein the gelatin is based cured gelatin.

11. A spray-dried powder comprising gelatin in combination with from about 30% to 100% by weight of the gelatin of an edible acid selected from the group consisting of citric acid, malic acid, ascorbic acid, tartaric acid, and mixtures thereof.

12. The composition of claim 11 and including suitable quantities of sugar and buffer salt to provide a gelatin dessert base.

* * * * *